US008694594B2

(12) United States Patent
Walsh et al.

(10) Patent No.: US 8,694,594 B2
(45) Date of Patent: Apr. 8, 2014

(54) METHOD AND SYSTEM FOR AUTOMATED TEAM SUPPORT MESSAGE DELIVERY

(75) Inventors: Thomas Walsh, Tecumseh, MI (US); Steven J. Catani, Athens, GA (US); Maurice Collins, Chelsea, MI (US); Lauren M. Didyk, Plymouth, MI (US); Helene Gidley, Plymouth, MI (US); David A. Gregorka, Ann Arbor, MI (US); John Hetrick, Ann Arbor, MI (US); Jeffrey Matthes, Ypsilanti, MI (US); Thomas E. Sox, Ambler, PA (US); Victor J. Strecher, Ann Arbor, MI (US); Raphaela Finkenauer O'Day, West Bloomfield, MI (US)

(73) Assignee: Wellness & Prevention, Inc., Ann Arbor, MI (US)

(*) Notice: Subject to any disclaimer, the term of this patent is extended or adjusted under 35 U.S.C. 154(b) by 52 days.

(21) Appl. No.: 13/336,080

(22) Filed: Dec. 23, 2011

(65) Prior Publication Data

US 2012/0173640 A1 Jul. 5, 2012

Related U.S. Application Data

(60) Provisional application No. 61/429,230, filed on Jan. 3, 2011.

(51) Int. Cl.
*G06F 15/16* (2006.01)
(52) U.S. Cl.
USPC .......................... 709/206; 709/219; 709/224
(58) Field of Classification Search
USPC .................. 709/204, 206, 217, 219, 223, 224
See application file for complete search history.

(56) References Cited

U.S. PATENT DOCUMENTS

| | | | |
|---|---|---|---|
| 6,375,469 B1 | 4/2002 | Brown | |
| 7,072,940 B1 | 7/2006 | Day et al. | |
| 7,584,114 B2 | 9/2009 | Estrada et al. | |
| 7,756,744 B2 | 7/2010 | Schiff et al. | |
| 7,822,823 B2 | 10/2010 | Jhanji et al. | |
| 7,895,078 B2 | 2/2011 | Schiff et al. | |
| 7,949,712 B2 | 5/2011 | Friedman | |
| 7,996,257 B2 | 8/2011 | Brooks | |
| 8,069,131 B1 | 11/2011 | Luechtefeld et al. | |
| 8,099,109 B2* | 1/2012 | Altman et al. | 455/456.3 |
| 8,109,874 B2 | 2/2012 | Kong et al. | |
| 8,125,314 B2 | 2/2012 | Fithian et al. | |
| 8,126,712 B2 | 2/2012 | Mukaigaito et al. | |
| 8,132,229 B2 | 3/2012 | Garbow et al. | |
| 8,166,124 B2* | 4/2012 | Davis et al. | 709/206 |
| 8,538,466 B2* | 9/2013 | Gupta et al. | 455/466 |
| 2003/0009497 A1* | 1/2003 | Yu | 707/513 |
| 2003/0046421 A1 | 3/2003 | Horvitz et al. | |
| 2003/0069780 A1 | 4/2003 | Hailwood et al. | |
| 2008/0034044 A1 | 2/2008 | Bhakta et al. | |
| 2008/0045236 A1 | 2/2008 | Nahon et al. | |

(Continued)

*Primary Examiner* — Viet Vu

(57) ABSTRACT

A method and system for providing personalized message delivery to one or more individual users of at least one team of users is disclosed. In accordance with the method and system, data specific to one or more individual users of at least one team of users is gathered, analyzed and used to determine preferences and order of precedence of the one or more individual users of the at least one team of users; and personalized message delivery is provided to the one or more individual users of the at least one team of users based upon the one or more individual users of the at least one team of users' preferences and order of precedence.

23 Claims, 4 Drawing Sheets

(56) References Cited

U.S. PATENT DOCUMENTS

| | | |
|---|---|---|
| 2008/0268823 A1 | 10/2008 | Shalev et al. |
| 2009/0037548 A1 | 2/2009 | Ordille et al. |
| 2009/0083761 A1 | 3/2009 | Mully |
| 2009/0124241 A1 | 5/2009 | Krishnaswamy et al. |
| 2009/0325609 A1 | 12/2009 | Rosen et al. |
| 2010/0145719 A1 | 6/2010 | Williams et al. |
| 2010/0280935 A1 | 11/2010 | Fellowes et al. |
| 2010/0318374 A1 | 12/2010 | Flake et al. |
| 2010/0324909 A1 | 12/2010 | Runge et al. |
| 2011/0071893 A1 | 3/2011 | Malhotra et al. |
| 2011/0072010 A1* | 3/2011 | Wu et al. ............ 707/722 |
| 2011/0112881 A1 | 5/2011 | Malhotra et al. |
| 2012/0036015 A1 | 2/2012 | Sheikh |

* cited by examiner

METHOD AND SYSTEM FOR AUTOMATED TEAM SUPPORT MESSAGE DELIVERY

CROSS-REFERENCE TO RELATED APPLICATIONS

This application claims the benefit of U.S. Provisional Application Ser. No. 61/429,230, filed Jan. 3, 2011, the contents of which are hereby incorporated by reference in their entirety.

FIELD OF THE INVENTION

The present invention relates to a method and system for providing message delivery to one or more members of one or more teams of users. The method and system are particularly useful in enhancing the member(s)' and the team(s)' ability to achieve stated goal(s).

BACKGROUND OF THE INVENTION

Different methods and/or systems for the delivery of information to individuals are known. For example, U.S. Pat. No. 7,949,712 to AT&T Intellectual Property L.L.P., discloses a method for deploying a high availability presence engine for instant messaging that includes: receiving a user's presence change information in a global table; updating the global table to reflect the change in the user's presence information; and sending updated presence information on the user to local tables of contacts affected by the change in the user's presence; and U.S. Pat. Nos. 7,756,744 and 7,895,078 to Dotomi Inc. disclose a method for messaging over a data network, comprising: i) providing an Administration Server (AS) in which user portfolios are stored, said AS being in communication with a terminal belonging to a user; ii) allowing every registered user to generate and update one or more user portfolio(s) containing information relative to Providers and/or individuals the messages of which the user is willing to view; and iii) displaying to one or more users on their terminal messages according to the information contained in the user portfolio. While many of these methods and/or systems provide information to the user, they lack the intuitiveness to decide when the message will be most effective, based on learned patterns, user feedback, lack of user feedback and user preferences as well as what the content of the message should be.

Commonly assigned co-pending U.S. application Ser. No. 13/283,039, filed on Nov. 27, 2011, entitled "METHOD AND SYSTEM FOR PERSONALIZED MESSAGE DELIVERY", the entire contents of which are incorporated herein by reference, provides a method and system for determining and implementing user preferences, normative data, location, and time, including, e.g., time of day, day of week and month of year, for the delivery of Just in Time Messages in a way innocuous to the user.

Different methods and/or systems for assisting communication between members of a team are also known. For example, U.S. Pat. No. 8,069,131 to Luechtefeld et al. discloses an artificially intelligent or rule-based system to assist teams or groups by improving the communication process between members of the team or group. U.S. Pat. No. 7,996,257 to International Business Machines Corporation (hereinafter referred to as IBM) discloses mechanisms for collecting, calculating, and reporting quantifiable peer feedback on relative contributions of team members. U.S. Pat. No. 7,584,114 to IBM discloses a method for integrating project events on a team collaboration server with personal calendars. U.S. Pat. No. 7,072,940 to Ford Motor Company discloses methods and apparatus for managing data and information between diverse organizations and data management systems.

In the interest of any team's functioning, building, and sustainability, effective communication is vital. While the methods and/or systems discussed above may assist communication between team members, they do not provide a method and/or a system that incorporates team member preferences and/or team characteristics and/or team objectives to convey messages in a personalized effective way to one or more members of the team.

SUMMARY OF THE INVENTION

The invention is directed to a method for providing personalized message delivery to at least one team of users or to individual users in a team, comprising: gathering data specific to said at least one team of users or to individual users in said team; analyzing said data to determine preferences of said at least one team of users or of said individual users in said team; determining an order of precedence of said preferences of said at least one team of users or of said individual users in said team; employing said preferences and said order of precedence to determine personalized message delivery of messages to said at least one team of users or to said individual users in said team; and providing said personalized message delivery of messages to said at least one team of users or to said individual users in said team.

The invention is also directed to a system for providing personalized message delivery to one or more individual users of at least one team of users, comprising: at least one user interface; a server, wherein said server comprises software, wherein said software gathers data specific to said one or more individual users of said at least one team of users, analyzes said data to determine preferences of said one or more individual users of said at least one team of users, determines an order of precedence of said preferences of said one or more individual users of said at least one team of users, and employs said preferences and said order of precedence to determine personalized message delivery of messages to said one or more individual users of said team of users; and a transmitter in communication with said processor and said at least one user interface, wherein said transmitter provides said personalized message delivery of messages to said one or more individual users of said at least one team of users through the at least one user interface.

The method and system of the invention, which provide correlated and prioritized message delivery to one or more individual users of at least one team of users, creates strategic team sustainability and provides assistance in the realization of the team's objectives.

DETAILED DESCRIPTION OF THE INVENTION

Definitions

Figure 1:
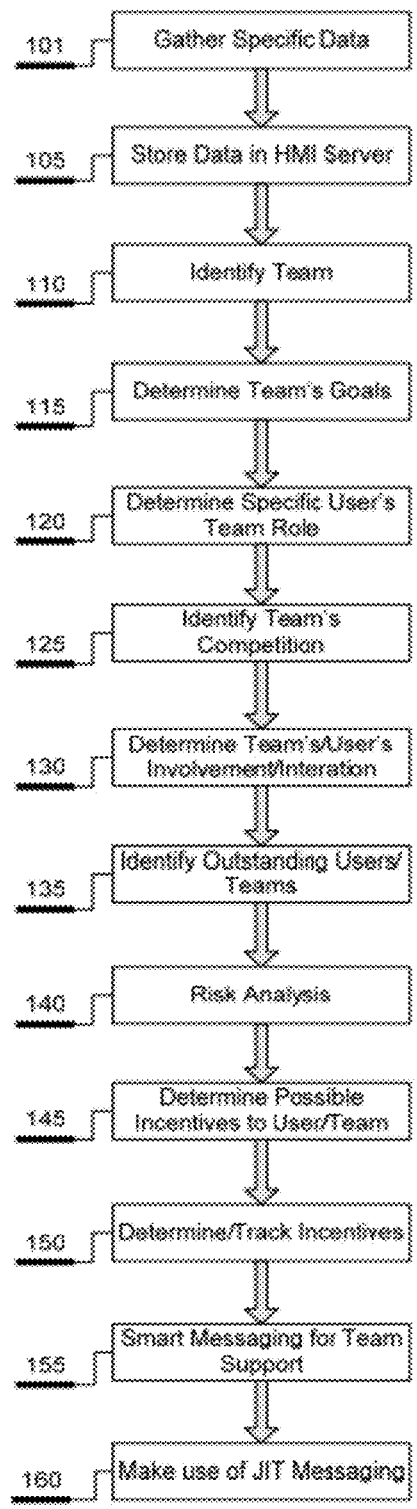
FIG. 1 is a flowchart showing an example of a method and system for providing message delivery to one or more members of one or more teams of users that may be used in accordance with the present invention.

Unless defined otherwise, all technical terms used herein have the same meaning as commonly understood by one of ordinary skill in the art to which the invention belongs. Also, all publications, patent applications, patents, and other references that may be mentioned herein are incorporated herein by reference.

Geo-Social Data: as used herein Geo-Social Data includes data from the assessment of locations recorded using location-acquisition technologies (e.g., GPS, phone "check in" applications, etc.) that allow generating life patterns, and which associate the user to places he/she frequently visits. Geo-Social Data includes Normative Data that corresponds to a specific location, or to similar locations.

Identified Team: as used herein an Identified Team generally includes individuals that share a set of qualities/characteristics used to achieve a common goal or target. E.g., athletic teams, business teams, support groups, members of an entity, etc. "Identified Team" and "Team" are used interchangeably throughout the specification.

Just in Time Message ("JIT Message"): as used herein JIT Message is a personalized response that may be made in message form, advertisement, reminder, etc., which is conveyed effectively to the user by prioritizing and correlating the message using specific pertinent data prior to the conveyance. As indicated below, Just in Time indicates that the delivery is at the appropriate time, frequency, tone, method and/or mode of delivery for the message content in accordance with User's Preferences (includes both internal and external input).

Network Access Device: as used herein means a device for accessing a communications network capable of transmitting and receiving digital data.

Normative Data: as used herein Normative Data includes data which represents the normal or average response or impact from any given event, (e.g., news, etc.), across various levels, (e.g., age, sex, etc.), used to compare a user's response with an objective external standard.

Now State: as used herein Now State means the best time, frequency, tone, method and/or mode for delivery of the message in accordance to User's Preferences.

Present Responsiveness: as used herein Present Responsiveness is a determination of the effectiveness of the message made using data collected from the user in the past, Normative Data and Geo-Social Data to the particular information, mode and method conveyed.

Real Time: as used herein means a process, action or transaction that involves updating information without artificial delay, i.e., at the same rate that the information is received.

Smart Team Message(s): as used herein a Smart Team Message is a communication to a User(s) that incorporates User's Preferences and a team's characteristics/objectives to convey a message in a personalized and effective way by providing correlated and prioritized message delivery.

User: as used herein a User may be a person, team, company, or organization participating in the automated team support messaging delivery system.

User's Preferences: as used herein User's Preferences are the preferences of a specific user as to the timing, frequency, message tone, method and/or mode of receiving/sharing information. The present invention provides a system and method of determining and implementing user preferences, goals and objectives, for the delivery of Smart Team Messages.

Referring now to FIG. 1, a flowchart that illustrates an example of a method and system for providing personalized message delivery, otherwise referred to herein as Smart Team Message(s), that may be used in accordance with the present invention. Although the method steps are presented in a logical order, the order presented should not be construed to limit the scope of the invention, unless specifically indicated. As explained above, in the interest of any team's functioning, building, and sustainability, effective communication is vital. As a result, message(s) delivered to team members should be correlated and prioritized prior to the conveyance and the timing, frequency, tone, method and/or mode in which the messages are conveyed should be considered to ensure that effective reception and consideration of the message(s) is achieved. To achieve this, data specific to a User is gathered continuously in a consistent format and in Real Time from an array of avenues 101 and stored in a server 105 containing software executable to determine User's Preferences and cause the delivery of JIT Messages. The data may come from direct inputs into the server 105 by the User or from different non-users through an array of different avenues. The software will also be able to analyze information and use the information gathered to identify a Team 110. Teams that can be used in the system may include Identified Teams, or virtual teams created by the system from shared characteristics and/or goals/objectives. Pertinent data collected for each Team can be used to make initial determinations of the Team's goals/objectives 115. For example, for a company team, the Team's objectives may be determined using benchmarking and may take into account things like industry standards, the company's credo, etc.

The inputted data is used to determine the specific role of each User 120. If the User is an individual, the system can determine what his/her duties are as part of the Team. If the User is a Team in a company, the system can just as well determine the Team's role in the company as a whole. It is thus contemplated that the method and system of the invention can also be used to provide message delivery to one or more Teams and/or between members of different Teams. Doing this will allow the identification of the User's/Team's competition 125. Identification of the User's/Team's competition will provide analytical data that can be used to determine the User's involvement, interaction, and performance accordingly 130. Additionally, it can be capable of identifying outstanding Teams within competitors 135. This data can be compared with encoded databases that can trigger signal (s) using predetermined risk factors at the option of the User or Team 140.

The User or Team may also opt to allow the system to compare data to identify possible incentives for the Team's effectiveness 145. Incentives can be used to encourage the Team's participation with the system to improve accuracy, effectiveness or performance. At 150, the system may track the effectiveness of the incentives in each Team, by tracking changes in the data received. All of the data is correlated by the system, taking User's elected participation to select specific predetermined Smart Team Messages from databases in the server 155. Upon selection, User Preferences and pertinent data can cause the system to deliver the Smart Team Messages. At 160, the system can implement JIT Messaging 160 to convey the particular message(s) to the User or Team.

Figure 2:
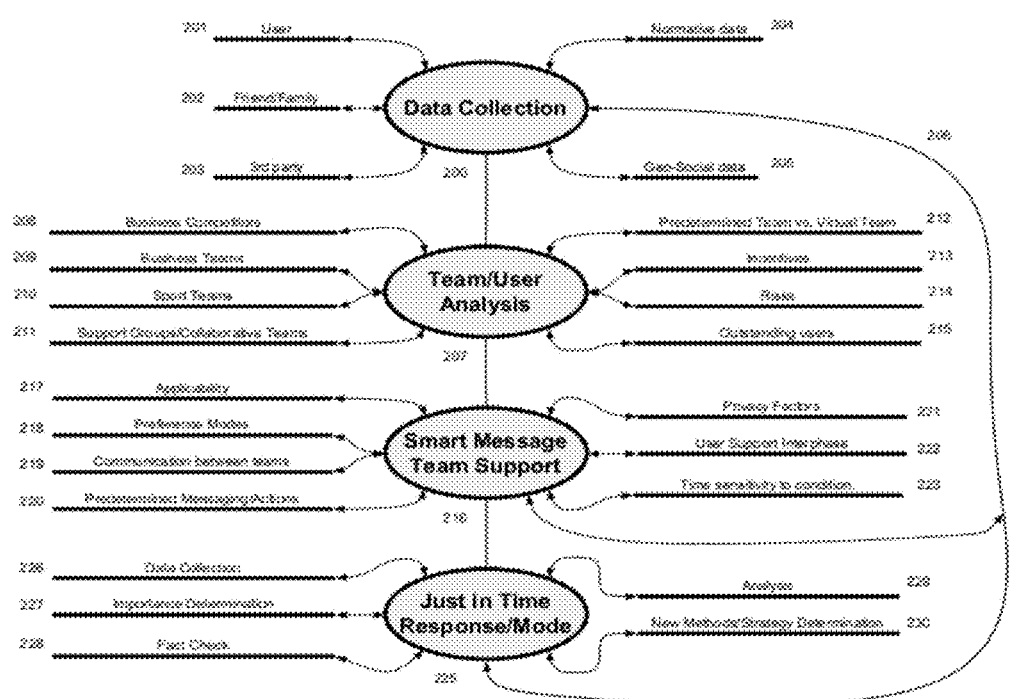
FIG. 2 is a schematic that illustrates in more detail steps and the corresponding factors of those steps that may be implemented when using the method and system of the present invention.

Referring now to FIG. 2, a schematic that illustrates in more detail steps and the corresponding factors of those steps that may be implemented when using the method and system of the present invention. Data collection 200 applicable to the User may include data received from different avenues. The data received must be in a consistent format and in Real Time. The User 201 can supply data to the server in different ways. User supplied data includes data taken from web/paper questionnaires/consultations, medical devices, wireless devices, PC, employers, etc.

Friends and family 202 may also provide relevant information about the user through different mediums. They can express concerns or provide applicable information about the user through any medium supported by the system. An example of a medium that would not burden this group and may be implemented by the system will be social networks. These are used every day and can provide useful information Real Time about the user without any additional effort.

Third parties 203 may also provide helpful data to the system. Third parties include the user's physician, coach, co-worker, manager, project manager, etc. These may include data input from the everyday use of mediums supported by the system in ways that do not require addition action(s). This can provide useful data to the system in many situations. For example, in situations where a change in the individual's activities, preferences, or behavior, is noticed by a third party and/or noted in e.g., a job evaluation, the system can detect the change from the data provided. In another scenario where the company is the one who enrolls the User, the company can elect certain topics, assessments, modes, etc. for implementation by the system.

Normative Data 204 and Geo-Social Data 205 can also help identify, correlate and associate responsiveness of messages to particular events/situations and Team goals/objectives. An example of where Normative Data may be useful is when a particular group of people who share the same characteristics, react a certain way or becomes interested in an event. The system can categorize, prioritize and correlate data received as a result of the reaction to the event for an importance determination. Finally, data generated from the response and effect of Smart Team Messages and JIT messages can also be used by the system for User Preference tailoring for future interaction and selection of messages 206.

The analysis of Users or Teams 207 by the system may use specific data based on the User's or Team's elected settings and a field. The fields may include business competitors 208, business groups within the same organization 209, sport competitors 210 and support/collaborative groups 211. The system may correlate and apply data accordingly whether the User has real competitors/supporters or virtual competitors/supporters generated by the system 212. Data from real competitors/supporters taken from, e.g., publicly available information, information provided by third parties, news, statistical data, Normative Data, etc., can be incorporated in the system. User may also use the system to generate virtual competitors/supporters by pairing up one or more Users with other Users or groups with similar characteristics/objectives. (E.g., support groups for substance abuse, eating disorders, weight loss; a virtual group with real people behind it, or a team that includes a member that is virtual may be used to balance the group dynamic in a specific team.)

The data can be employed to identify incentives 213, possible risks 214 and/or outstanding competitors/supporters 215. Algorithms can be employed to correlate data from different inputs to determine applicability 217 and need of particular message/action for an Identified Team. For example, an algorithm can be used to determine the need for motivational, encouraging, administrative, comparative, etc., communication(s) depending on User data/Team activity. The system can provide direct comparisons for the User/Team to review if desired.

Selected options or preference modes 218 set up by Users can also be used for applicable determination(s) by the system. These may allow the system to facilitate predetermined messages/actions for communications between competing/supporting Determined Teams 219, 220. E.g., sending a signal for attention or a predetermined message such as "going for a walk—anyone want to join?" This function may be implemented when Identified Teams are competing with or supporting each other vs. virtual teams.

Figure 3:
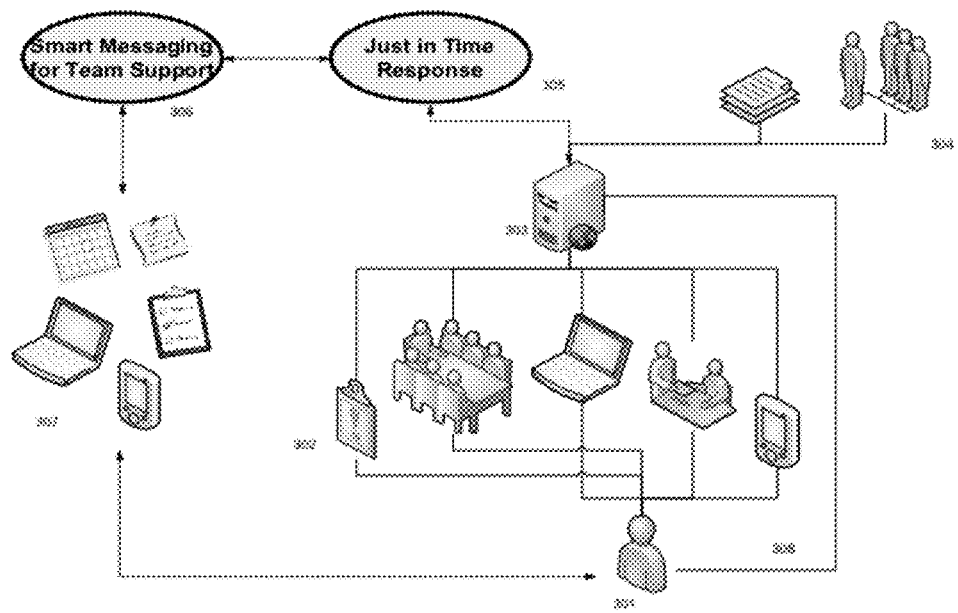
FIG. 3 is a schematic that illustrates a general sequence of events that may be followed when using the method and system of the present invention.

The User may input privacy settings 221 using any of the input devices supported by the system. Some privacy settings can be predetermined to protect data collected and prevent unintended dissemination of private information. Moreover, the system may use the privacy settings to correlate messages and to limit the use of the information. The system can provide a Support Interface 222 to allow the User or the provider of the program to set privacy and/or additional settings, e.g., scope of participation, monitoring, etc. JIT Message delivery can be used by the system to provide effective communication depending on the determined time sensitivity 223. The system can collect more data by generating specific questions for the User, as required to complete determinations for Smart Team Support 225/226 or JIT Messaging. (E.g., do you want all urgent messages to be sent directly to your phone as SMS?) Using all the data the system will send the JIT Message after making the importance determination 227, check facts 228, perform the respective analysis 229, and determine/suggest new methods/strategies that can be used 230. Referring now to FIG. 3, possible sources of data input and storage of data are shown for the determination of Smart Team Messaging as described above. The User 301 of the system directly 308 or indirectly provides data through different avenues 302. The data is gathered by a server 303, which also collects other information 304 that includes Normative Data and Geo-Social Data as explained above. The server contains software executable to perform the functions described above for providing the JIT Message 305 and for providing the Smart Team Message(s) to the User(s) 306. The JIT Message and the Smart Team Message(s) may be conveyed using User Preferences. In addition, data 307 can be collected continuously through various devices, e.g., wireless devices, PC, etc., to update/increase the precision of JIT Message and/or the Smart Team Message delivery for future prospective messages.

Figure 4:
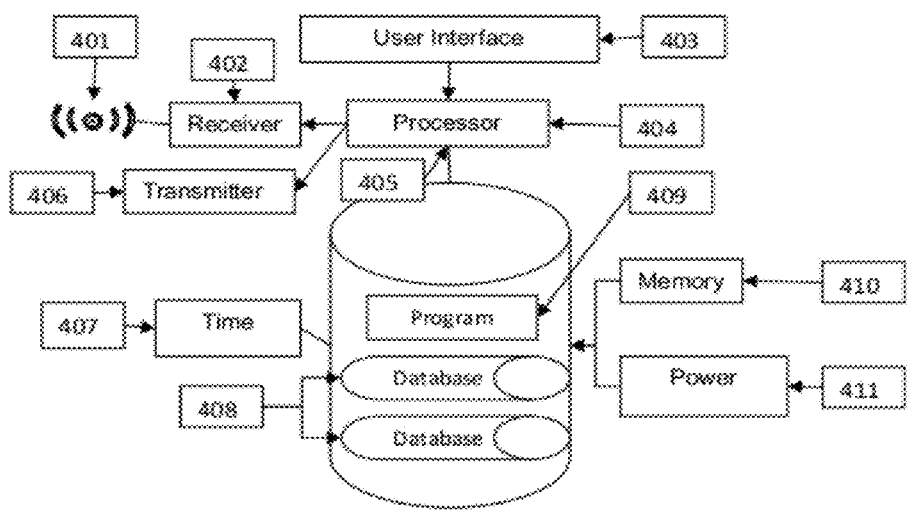
FIG. 4 is a schematic that illustrates a server that may be employed when using the method and system of the present invention.

Referring now to FIG. 4, a schematic that illustrates a server that may be employed when using the method and system of the present invention. The server can contain different means of receiving information 401. For example, Bluetooth technology, network/internet capabilities, etc. A receiver 402 can be used to allow a processor 404 to cause the data to be stored in specific databases 408 in uniform format and time. The data can then be used by a software program 409 executable to perform the functions as described above. The server also includes a User interphase 403, a processor for the software 405, a means of power 411, memory 410, and a means of keeping Real Time 407 in relation to the specific location of the individual (e.g., connecting the User's cell phone to the system to change time accordingly when required due to the User traveling.) A transmitter 406 in logical communication with the processor 404 transmits one or more JIT Messages and/or one or more Smart Team Messages to one or more Network Access Devices associated with the User (not shown) based upon the order of precedence, the NOW state and the priority of messages as described above.

The foregoing examples are not intended to limit the scope of the present invention, which may be set out in the claims. In particular, various equivalents and substitutions will be recognized by those skilled in the art in view of the foregoing disclosure and these are contemplated to be within the scope of the invention.

What is claimed is:

1. A method for providing personalized message delivery to at least one team of users or to individual users in a team, comprising:
    gathering data specific to said at least one team of users or to one or more individual users in said team;
    analyzing said data to determine said team's goals or objectives;
    analyzing said data to determine preferences of said at least one team of users or of said one or more individual users in said team;
    determining an order of precedence of said preferences of said at least one team of users or of said one or more individual users in said team;
    correlating said data, said preferences and said order of precedence to select predetermined messages for said at least one team of users or to said one or more individual users in said team; and
    providing said selected, predetermined personalized messages to said at least one team of users or to said one or more individual users in said team to provide assistance in the realization of said team's goals or objectives.

2. The method of claim 1, wherein said data is selected from the group consisting of location of one or more individual users of said at least one team of users, time that one or more individual users of said at least one team of users conducts a given activity; response of one or more individual users of said at least one team of users to a given event, request of one or more individual users of said at least one team of users for information regarding a given event.

3. The method of claim 1, wherein said preferences are selected from the group consisting of topic, time, frequency, tone, method and mode.

4. The method of claim 1, wherein said personalized message delivery is selected from the group consisting of topic, time of delivery, tone of delivery, frequency of delivery, method of delivery and mode of delivery.

5. The method of claim 1, wherein said personalized message delivery provides messages to said one or more individual users of said at least one team of users regarding desired topics.

6. The method of claim 1, wherein said personalized message delivery provides messages to said one or more individual users of said at least one team of users at desired times.

7. The method of claim 1, wherein said personalized message delivery provides messages to said one or more individual users of said at least one team of users employing desired tones.

8. The method of claim 1, wherein said personalized message delivery provides messages to said one or more individual users of said at least one team of users at desired frequency.

9. The method of claim 1, wherein said personalized message delivery provides messages to said one or more individual users of said at least one team of users employing desired methods of delivery.

10. The method of claim 1, wherein said personalized message delivery provides messages to said one or more individual users of said at least one team of users employing desired modes of delivery.

11. The method of claim 1, wherein said method permits communication between an administrator of a team of users and one or more individual users of said team of users.

12. The method of claim 1, wherein said method permits communication between one or more individual users of a team of users.

13. The method of claim 1, wherein said method permits communication between one or more individual users of a first team of users and one or more individuals of one or more additional teams of users.

14. A system for providing personalized message delivery to one or more individual users of at least one team of users, comprising:
    at least one user interface;
    a server, wherein said server comprises software, wherein said software gathers data specific to said one or more individual users of said at least one team of users, analyzes said data to determine said team's goals or objectives, analyzes said data to determine preferences of said one or more individual users of said at least one team of users, determines an order of precedence of said preferences of said one or more individual users of said at least one team of users, and correlates said data, said preferences and said order of precedence to select predetermined messages for said one or more individual users of said team of users; and
    a transmitter in communication with said processor and said at least one user interface, wherein said transmitter provides said selected, predetermined personalized messages to said one or more individual users of said at least one team of users through the at least one user interface team to provide assistance in the realization of said team's goals or objectives.

15. The system of claim 14, wherein the software is operative to receive a timing of one or more events in the one or more individual users of said at least one team of users' schedule and to queue a time for one or more transmissions of information to the one or more individual users of said at least one team of users based the one or more events in the one or more individual users of said at least one team of user's schedule.

16. The system of claim 14, wherein the software is operative to check facts related to the one or more individual users of said at least one team of users.

17. The system of claim 15, wherein the software is operative to check the facts via an Internet query.

18. The system of claim 14, wherein the software is operative to determine an order of precedence of one or more individual users of said at least one team of users' preferences based on a goal set by the one or more individual users of said at least one team of users.

19. The system of claim 14, wherein the software is operative to add new content to the messages based upon the preferences of the one or more individual users of said at least one team of users.

20. The system of claim 14, wherein the software is operative to transmit to a network access device associated with a third party the messages transmitted to the one or more individual users of said at least one team of users.

21. The system of claim 19, wherein the software is operative to transmit to the network access device associated with a third party a reason for transmission of a particular message.

22. The system of claim 19, wherein the system is adapted to be capable of determining a location of said one or more individual users of said at least one team of users and to transmit a message to said one or more individual users of said at least one team of users based upon said location.

23. The system of claim 21, wherein the system capable of automatically determining a location comprises a GPS location device.

\* \* \* \* \*